United States Patent [19]

Pollock

[11] 4,205,855
[45] Jun. 3, 1980

[54] SOUND REPRODUCING APPARATUS

[76] Inventor: Thomas M. Pollock, Fairfield, Glebe La., Kilmacolm, Renfrewshire, Scotland

[21] Appl. No.: 888,611

[22] Filed: Mar. 21, 1978

[30] Foreign Application Priority Data

Mar. 25, 1977 [GB] United Kingdom ............... 12732/77

[51] Int. Cl.² ............................................. G11B 3/10
[52] U.S. Cl. .................................................. 274/23 R
[58] Field of Search ........................ 274/23, 24, 1 R; 174/117 FF, 117 PC

[56] References Cited

U.S. PATENT DOCUMENTS

| | | | |
|---|---|---|---|
| 2,532,803 | 12/1950 | Faus | 274/23 R |
| 2,963,535 | 12/1960 | Wegener et al. | 174/117 PC |
| 3,001,031 | 9/1961 | Jacque | 274/23 R |
| 3,007,997 | 11/1961 | Panariti | 174/117 PC |
| 3,244,795 | 4/1966 | Latimer | 174/117 PC |
| 3,409,732 | 11/1968 | Dahlgren et al. | 174/68.5 |

*Primary Examiner*—John W. Shepperd
*Attorney, Agent, or Firm*—Larson, Taylor and Hinds

[57] ABSTRACT

A tone arm for sound reproducing apparatus comprises an elongated member of electrical insulating material arranged to support a pick-up head at one end and to be pivotally supported at a point remote from said one end. Several spaced electrical current conductors are carried by the elongated member. The electrical current conductors are formed by a printed circuit technique. At least selected conductors are arranged to be connected at one end to a pick-up head mounted on the arm and at the other end to take-off leads.

1 Claim, 2 Drawing Figures

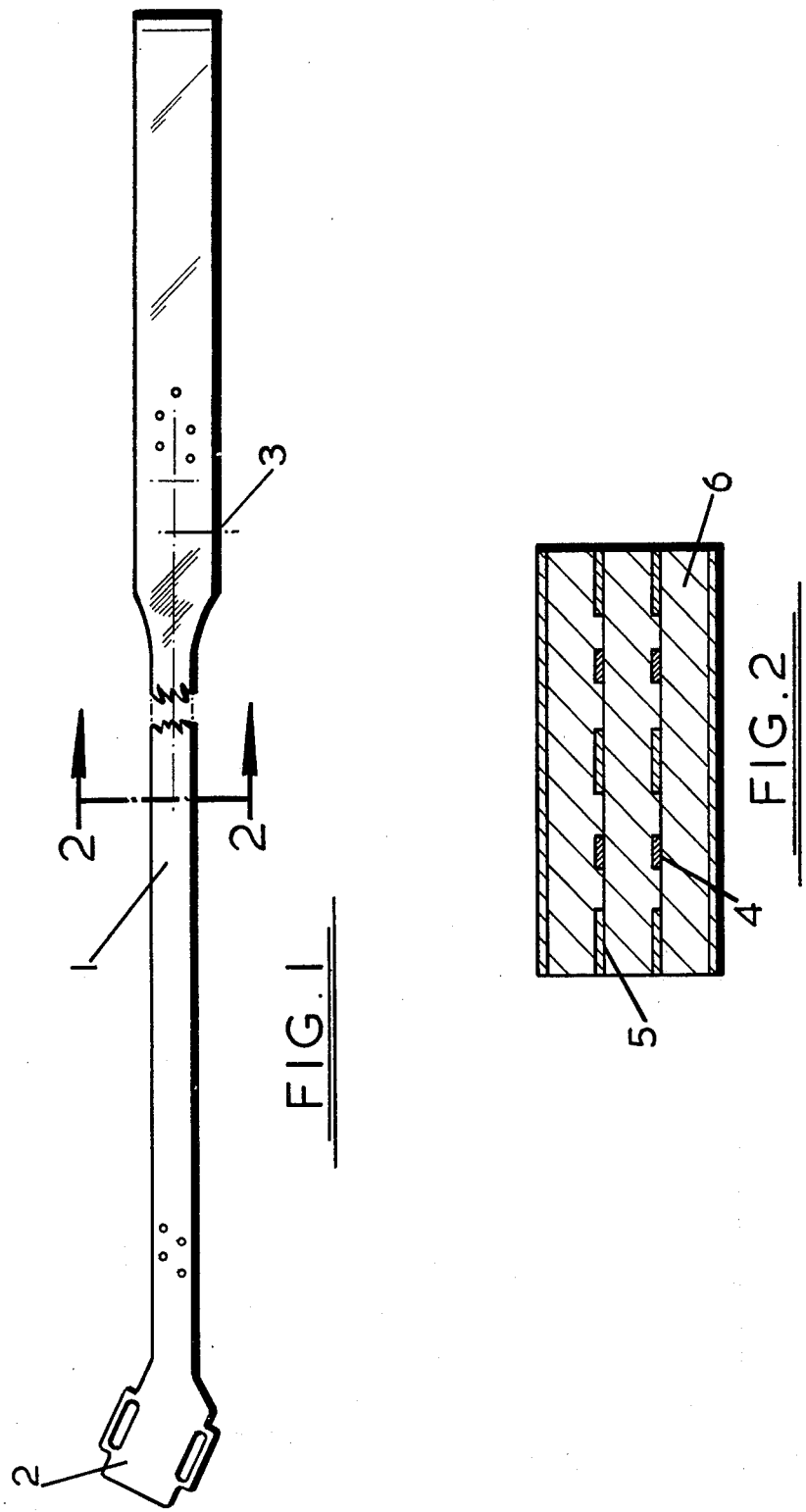

SOUND REPRODUCING APPARATUS

This invention relates to tone arms for sound reproducing apparatus and particularly but not exclusively to tone arms for stereophonic apparatus, the type of apparatus being that arranged for sound reproduction from a record.

Such apparatus commonly has a rotatable turntable on which a record may be placed, the record being contactable by a stylus carried by a tone arm. Signals representing sounds to be reproduced are transmitted as displacement signals from the record to the stylus and thence as electrical signals to an amplifier and loudspeaker via electrically conducting wires extending from the stylus through the tone arm.

Such an arrangement has certain disadvantages. Firstly, the proximity of the conducting wires to one another within the tone arm gives rise to electrical screening problems. This is particularly troublesome in stereophonic apparatus. Secondly, the tone arm is usually of tubular construction and this can give rise to undesirable resonance.

An object of the present invention is to reduce or obviate the problems associated with electrical interference between the leads and the distortion this introduces into the reproduced sound.

According to the present invention a tone arm for sound reproducing apparatus comprises an elongated member of electrically insulating material arranged to support a pick-up head at one end and to be pivotally supported at a point remote from said one end and several spaced electrical current conductors formed by a printed circuit technique on the elongated member, at least selected conductors being arranged for connection at one end to a pick-up head supported by the arm and at the other end to take-off leads.

In one construction the elongated member is a one piece member, the material forming the conductors being deposited on the outside surface of the member. The member may be of polygonal form in cross section and a convenient section is an oblong. The long dimension of the oblong may coincide with the depth of the arm the short dimension then coinciding with the width of the arm. In this construction one conductor may be deposited on each side of the arm where there are two conductors or selected conductors may be deposited on opposite sides where there are more than two conductors. At least one additional conductor may be deposited on the surface constituting the upper and/or the lower surfaces of the tone arm.

In another construction the arm may be formed as a laminate with several laminae fastened together to form the complete elongated member.

In the laminated construction the laminae may be disposed in side by side vertical planes with reference to the normal operating position of the tone arm, i.e. the contiguous faces of the laminae are parallel to the outer side face of the arm.

Alternatively the laminae may be stacked one on top of the other, i.e. in horizontal planes with reference to the normal operating position of the tone arm, so that the contiguous faces are parallel with the upper and lower surfaces of the arm.

In the construction in which the arm is composed of several laminae at least one conductor may be formed on a face of a lamina which will be in contact with a face of an adjoining lamina so that such conductor will be completely enclosed when the laminae are fastened to one another. At least one conductor may be additionally or alternatively formed on an outer surface of the member as described in connection with the one piece member.

In a monaural tone arm there will normally be two conductors and in a stereophonic or binaural tone arm there will be normally four conductors. For special purposes there may be more than four conductors e.g. for suppression of interference certain conductors may be arranged as non-signal carrying conductors intended to be earthed.

The conductors may be formed by deposition of metallic material by an evaporation process or they may be formed by electro-deposition. In either case the metallic material of the conductors may be deposited first as a layer and is subsequently selectively etched to leave independent unconnected strips each constituting a conductor.

The elongated member or the laminae forming the elongated member may be formed of a synthetic material such as a glass epoxy resin or may be formed of a natural material such a wood.

A practical embodiment of the invention is illustrated in the accompanying drawings in which FIG. 1 is a plan view of a tone arm and FIG. 2 is a section to a larger scale through the lines 2—2.

In the drawings 1 denotes an elongated member formed of electrical insulating material, the member being formed at one end at 2 to support a pick-up head and is arranged to be pivotally supported at the point 3 remote from the end 2. Referring to FIG. 2, 4 denotes electrical current conductors indicated in the drawing in closely spaced hatching lines which are signal carrying current conductors and 5 denotes current conductors indicated by more widely spaced hatching lines. These are conductors intended to be earthed to suppress electric fields produced by flow of current in the signal carrying conductors 4 and reduce or prevent the generation of a noise. 6 denotes separate laminae on which the conductor material has been deposited. For clarity of illustration the conductors are shown much thicker than they are in reality.

In practice a tone arm constructed as described is extremely light and yet is rigid. By its construction it can be made with a high moment of inertia in a particular direction where it is most required. The conductors are well spaced from one another and not only are they well spaced but there is interposed between them the material forming the elongated member which has a dielectric constant much higher than that of air which apart from the insulation surrounding lead wires is the usual substance separating the lead wires in a tone arm. Also by the construction the conductors are accurately and rigidly held in predetermined positions and the earth conductors can also be held in predetermined positions to provide the maximum of screening effect. The non-metallic material of which the tone arm is made is also more readily worked and formed to shape than the metallic tube from which tone arms are normally produced. The solid construction of the arm also results in suppression of the form of resonance which is present in many metallic tubular tone arms.

What is claimed is:

1. A tone arm for sound reproducing apparatus comprising a solid, rigid elongated member of electrically insulating material formed as a laminate and comprising several laminae stacked one on top of the other including first connection means formed at one end for providing attachment of a pick-up head and second connection means formed at a point remote from said one end for providing attachment of a pivot support, a plurality of spaced printed circuit form electrical current conductors being formed on a face of at least one lamina which abuts against a face of an adjoining lamina completely enclosing the conductors, at least selected conductors being provided at opposite ends with take-off leads for connection respectively to a pick-up head supported by the arm and to signal reproducing apparatus and in which selected conductors are arranged to be nonsignal carrying conductors provided with take-off leads only at the ends thereof remote from the end of the tone arm formed to receive a pick-up head, said take-off leads being connected to a ground connection.

* * * * *